Figure 1:
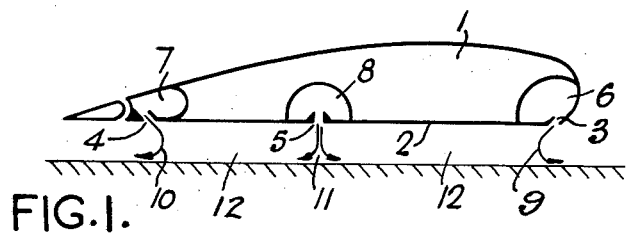

March 10, 1964  C. S. COCKERELL  3,124,322
AIRCRAFT WITH FLUID SUSTAINING MEANS
Filed Oct. 18, 1960  4 Sheets-Sheet 1

Inventor
C. S. COCKERELL
By Cameron, Kerkam & Sutton
Attorneys

March 10, 1964    C. S. COCKERELL    3,124,322
AIRCRAFT WITH FLUID SUSTAINING MEANS
Filed Oct. 18, 1960    4 Sheets-Sheet 2

Inventor
C. S. COCKERELL
By Cameron, Kerkam & Sutton
Attorneys

March 10, 1964   C. S. COCKERELL   3,124,322
AIRCRAFT WITH FLUID SUSTAINING MEANS
Filed Oct. 18, 1960   4 Sheets-Sheet 3

Inventor
C. S. COCKERELL
By Cameron, Kerkam & Sutton
Attorneys

March 10, 1964   C. S. COCKERELL   3,124,322
AIRCRAFT WITH FLUID SUSTAINING MEANS
Filed Oct. 18, 1960   4 Sheets-Sheet 4
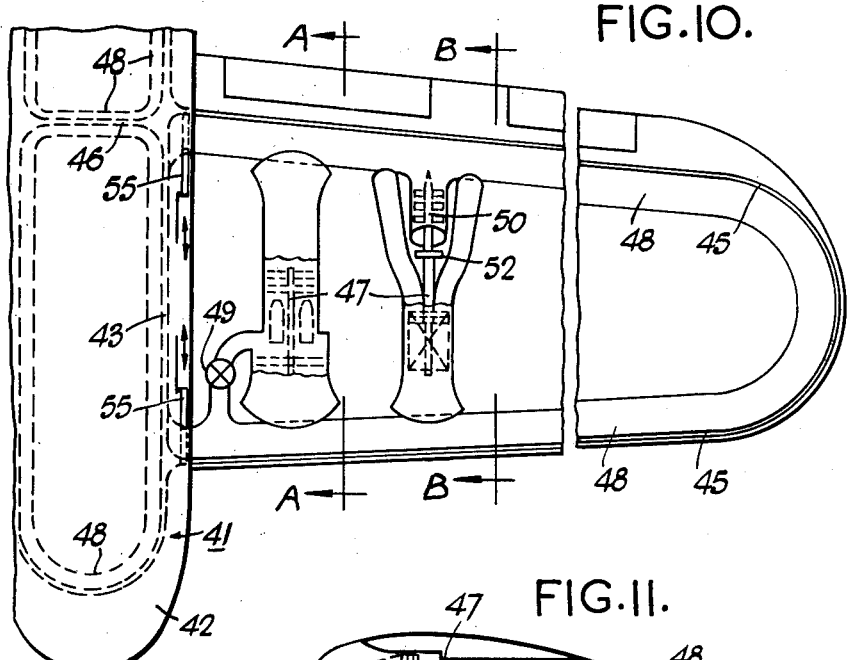
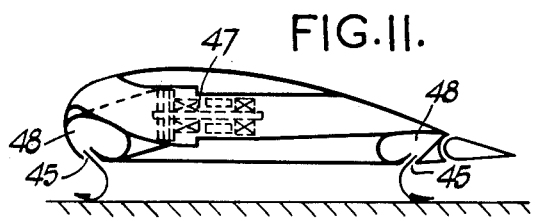
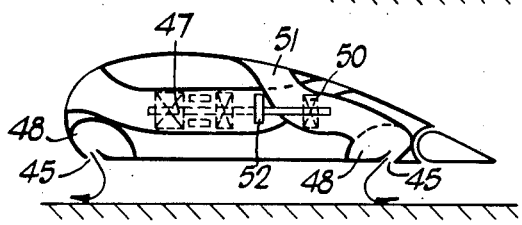
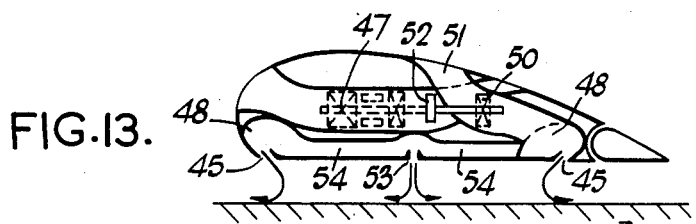

United States Patent Office 3,124,322
Patented Mar. 10, 1964

3,124,322
AIRCRAFT WITH FLUID SUSTAINING MEANS
Christopher Sydney Cockerell, East Cowes, Isle of Wight, England, assignor to Hovercraft Development Limited, London, England, a British company
Filed Oct. 18, 1960, Ser. No. 63,296
Claims priority, application Great Britain May 2, 1957
7 Claims. (Cl. 244—12)

This invention relates to aircraft and control surfaces of aircraft, such as rudders, and also to means for assisting take-off and landing of aircraft.

This application is a continuation-in-part of applications Serial No. 731,474, filed April 28, 1958; Serial No. 6,999, filed February 5, 1960; and Serial No. 16,677 filed March 22, 1960.

It is an object of the invention to provide an aircraft member having a surface provided with means for producing a cushion of pressurised gas in contact with that surface in such a manner that on movement of the member through the air aerodynamic forces are produced on that member.

It is a further object of the invention to provide an aircraft having a wing provided with means in the under surface of the wing for producing a cushion of pressurised gas beneath the wing which initially assists in supporting the aircraft clear of the take-off or landing surface, the cushion also acting to produce aerodynamic lift on the wing when the aircraft is in motion.

According to the invention there is provided an aircraft member having a surface provided with at least two supply ports extending in a direction substantially normal to the direction of motion of the member through the air, means for supplying gas to the supply ports, the gas issuing from the supply ports in the form of gaseous curtains, the gaseous curtains when in operation bounding or assisting in bounding a space in contact with the said surface of the member, and means for forming and maintaining a cushion of pressurised gas in said space.

According to a further feature of the invention there is provided a wing for an aircraft having in the bottom surface of the wing a first supply port adjacent to and substantially parallel to the leading edge and a second supply port adjacent to and substantially parallel to the trailing edge, means for supplying gas to the supply ports, the gas issuing from the supply ports in the form of gaseous curtains which in operation bound or assist in bounding a space beneath the wing, and means for forming and maintaining at least one cushion of pressurised gas in the said space.

The gas supplied to the supply ports and forming the gaseous curtains, can be air, exhaust gases from the engines, or a mixture of both. The curtains, when in operation, generally provide the means for forming the cushion of pressurised gas, which is therefore composed of the same gas as the curtains. However means may be provided for blowing further gas into the cushion through one or more ports formed in the surface of the member.

Additionally, there may be means for forming a further gaseous curtain between the aforesaid gaseous curtains.

When the invention is applied to an aircraft wing, the wing is generally of an aerofoil section with the exception that the undersurface may be flat. Further, the wing is generally arranged so that, in level flight, it has a zero angle of incidence.

When applied to a control surface, the gas is supplied, as required, to the supply ports in one surface or the other to give the effect of movement of the control surface.

Figure 2:
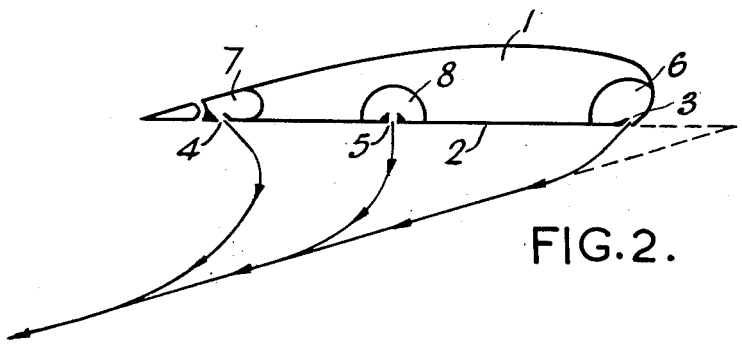
Figure 3:
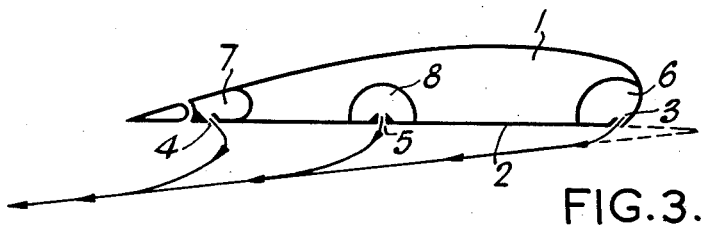
Figure 4:
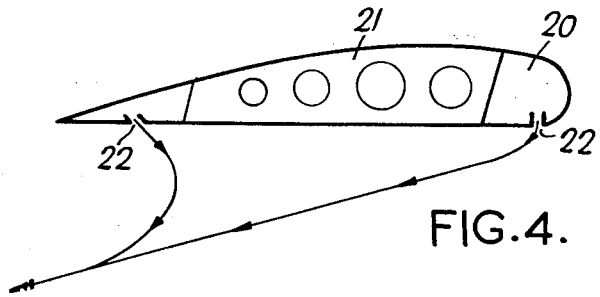
Figure 5:
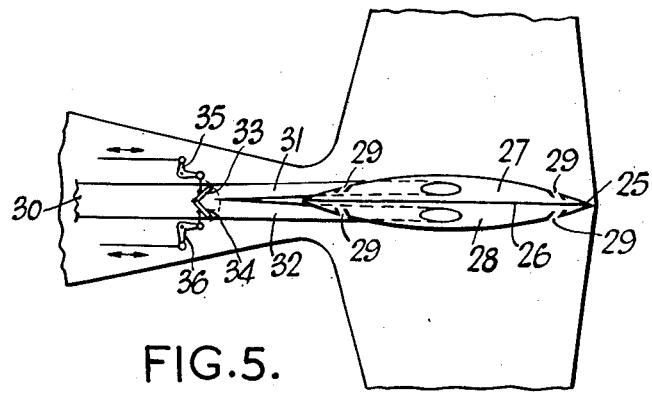
Figure 6:
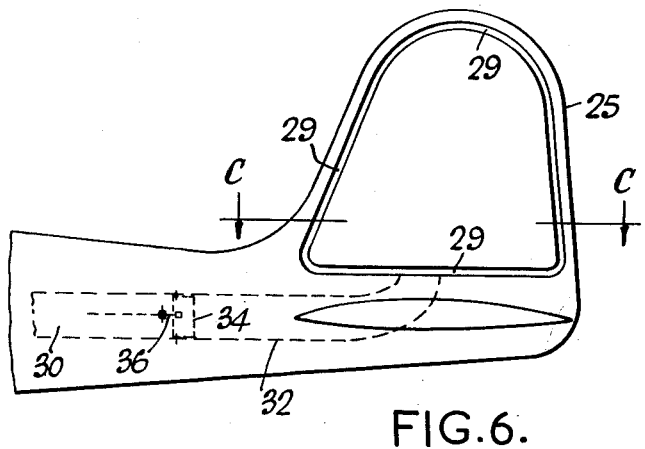
Figure 14:
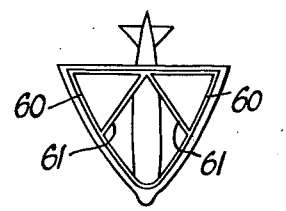
Figure 7:
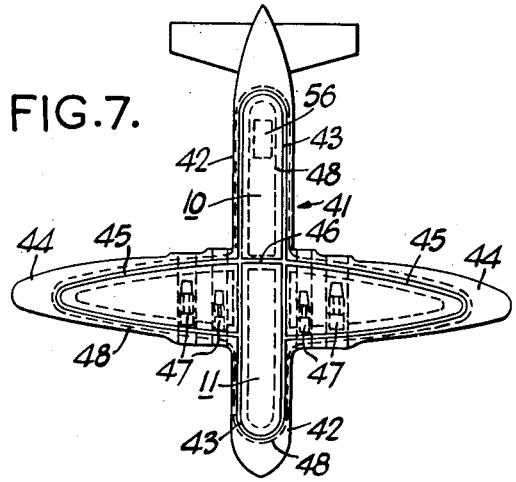
Figure 8:
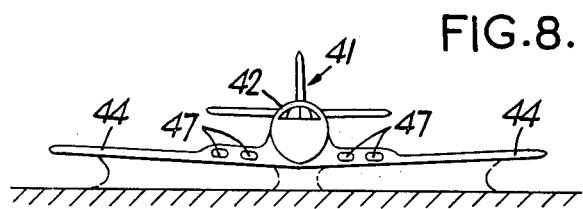
Figure 9:
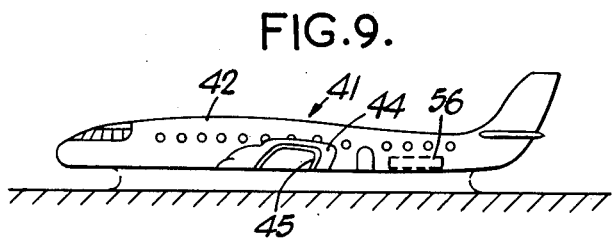

The invention will be readily understood from the following description of various embodiments in conjunction with the accompanying drawings in which:

FIGURE 1 is a diagrammatic cross-section of a wing embodying the invention, illustrating the gas flow pattern when the aircraft is stationary, FIGURE 2 illustrates the gas flow pattern for the wing illustrated in FIGURE 1 when the aircraft is flying at a moderate speed, FIGURE 3 illustrates the gas flow pattern for the wing illustrated in FIGURE 1 when the aircraft is flying at a higher speed, FIGURE 4 is a chordwise vertical cross-section through a helicopter rotor blade, embodying the invention, FIGURE 5 is a horizontal cross-section through a rudder embodying the invention, on the line C—C of FIGURE 6, FIGURE 6 is a side view of the rudder shown in FIGURE 5, FIGURE 7 is an inverted plan view of an aircraft embodying the invention, FIGURE 8 is a front elevation of the aircraft shown in FIGURE 7, FIGURE 9 is a side elevation of the aircraft shown in FIGURE 7, FIGURE 10 is a horizontal cross-section through a wing of the aircraft shown in FIGURE 7, FIGURE 11 is a vertical cross-section on the line A—A of FIGURE 10, FIGURE 12 is a vertical cross-section on the line B—B of FIGURE 10, FIGURE 13 is a similar cross-section to that shown in FIGURE 12, illustrating the provision of an additional supply port, and FIGURE 14 is an inverted plan view of a further form of aircraft embodying the invention.

Referring to FIGURES 1 to 3 of the drawings, there is shown an aircraft wing 1 of modified aerofoil section having a flat under surface 2. Supply ports 3 and 4 are formed in the under surface 2, adjacent to the leading edge and trailing edge, and extending the length of the wing. A further supply port 5 is formed in the under surface 2, at approximately mid chord, again extending the length of the wing. The three supply ports converge and meet at the tip. Gases are fed to the supply ports 3, 4 and 5 by ducts 6, 7 and 8 respectively. The wing is arranged so that in level flight, it has a zero angle of incidence.

In operation, gas is supplied via the ducts 6, 7 and 8 to the supply ports. Initially with the aircraft stationary, the gas issues from the supply ports to form gaseous curtains 9, 10 and 11 resulting in the formation of a cushion of pressurised gas 12, beneath the wing which assists in supporting the aircraft off the surface. The manner in which the cushion is formed is the same as that hereinafter described with reference to the aircraft of FIGURES 7-12. As the aircraft gathers speed, the lower part of the front gaseous curtain 9 becomes deflected rearwardly. Likewise, the lower parts of the other two gaseous curtains 10 and 11 become deflected and finally merge to form a composite gaseous curtain as shown in FIGURE 2. As the speed of the aircraft increases further the curtains are further deflected reaching the condition shown in FIGURE 3. There is thus formed, beneath each wing of the aircraft, a wedge of gas having an upper surface bounded by the under surface of the wing. The apex angle of the wedge of gas will depend upon the speed of the aircraft and the mass flow of the gases forming the gaseous curtains. The wedges of gas thus formed ride over the air encountered so that lift is imparted to the aircraft. Due to the fact that the wings themselves have a zero angle of incidence the drag component is considerably reduced.

The supply port 3, adjacent to the leading edge, may be arranged, as shown, to discharge the gas inwards towards the centre of the wing. Whilst this is the most efficient manner for the formation of a normal cushion of pressurised gas, for most effective formation of the wedge shaped cushion during flight it is probable that an angle of discharge nearer the vertical is desirable. The angles of discharge of the other gaseous curtains may also be varied to suit requirements, and it can also be arranged that the angle of discharge can be varied during operation of the aircraft.

As stated above, the wings are arranged to have a zero angle of incidence when in level flight, but in spite of this it is possible to obtain lift due to the composite gaseous curtain and the enclosed wedge-shaped cushion of gas, formed beneath the wing. Thus the wings have in effect an angle of incidence which is equal to the apex angle of the wedge-shaped cushion. This apex angle can be varied by varying the mass flow of the gaseous curtains, thus altering the effective angle of incidence. Also, by varying the relative mass flows of the central gaseous curtain 11 and gaseous curtains 9 and 10, the effective centre of pressure can also be varied.

The invention is also applicable to the rotating wings or blades of helicopters. A cross-section of a typical rotor blade would be substantially as shown in FIGURE 4. The blade 20 is hollow, air being fed to the blade from an engine mounted in the body of the helicopter. Ribs 21, are provided to stiffen the blade, holes being pierced in the ribs for lightness and to allow free flow of air. The air issues from a supply port 22 formed right round the periphery of the blade, in the bottom surface. By cyclic variation of the air flow in any suitable manner, at least some of the cyclic pitch variation of the blades normally required as they rotate, can be obviated. The helicopter can either be initially supported clear of the surface by a cushion of air formed beneath the main body in the manner hereinafter described with reference to the aircraft of FIGURES 7–12, or, which is most likely, the helicopter will rest on the surface until the rotor is rotating fast enough to produce sufficient lift.

FIGURES 5 and 6 illustrate the invention applied to a control surface of an aircraft, in this particular case a rudder. The rudder 25 is hollow and divided vertically by a diaphragm 26 which extends from the leading edge to the trailing edge into two sections 27 and 28. An endless supply port 29 is formed on each side of the rudder adjacent to the periphery thereof. Air is fed from a convenient source via a duct 30 which subdivides into two ducts 31 and 32, which supply air to the two sections 27 and 28. Hinged flaps 33 and 34 regulate the air into the ducts 31 and 32. In operation, when rudder action is required, one or other of the flaps 33 and 34 is opened, by linkage 35 or 36 air passing to the revelant section of the rudder, and issuing from the supply port. For example operation of flap 33 admits air to the starboard section 27. A wedge shaped cushion is formed which causes the rudder to receive a thrust to port, the aircraft thus turning to starboard. Variation of the mass flow of the air curtain formed by the air issuing from the supply port by varying the degree of opening of the flaps 33 and 34 will vary the "rudder effect" obtained.

The invention is also applicable to aircraft of the character described in co-pending application Serial No. 731,474, now abandoned, of which this application is a continuation-in-part, i.e. aircraft wherein gas turbine or rocket engines, or other sources which are capable of supplying moving gases or air, are so disposed that said engines or sources discharge exhaust gases or air in such a manner as to result in the formation of a curtain, which effectively encloses a space between the underside of the aircraft and the surface from which the aircraft is to take off, or on which it is to land, wherein a cushion of gas may be formed and retained having a pressure sufficient to assist in raising or supporting the aircraft out of contact with said surface.

Referring now to FIGURES 7 to 12 of the drawings, there is shown a conventional aircraft 41, the underside of the fuselage 42 of which has an endless substantially elliptically extending supply port 43 which defines a substantially cigar-shaped area beneath the fuselage. The wings 44 of the aircraft each also has an endless peripherally extending supply port 45 which is connected to the supply port 43. A further supply port 46 in the bottom of the fuselage 42 divides the area defined by the supply port 43 into two parts.

The engines 47 of the aircraft are conventional gas turbine engines and are arranged to discharge air into duct 48 from which the air issues from the supply ports 43, 45 and 46 to form air curtains which enclose a space beneath the vehicle.

The arrangements of the gas turbine engines and the supply of air are more readily seen in FIGURES 10, 11 and 12. As will be seen, the engines 47 discharge air into ducts 48 from which the air is fed to supply ports 43, 45 and 46, the air discharged from the inboard engine being controlled by a flap or valve 49, while the outboard engine is adapted to drive a compressor 50 which has an intake 51 in the top of the wing and discharges directly into the duct 48. A clutch 52 is provided for disconnecting the compressor from the engine when desired.

Operation of the aircraft is as follows:

When the aircraft is to take off, the engines 47 are started, valve 49 being closed and clutch 52 disengaged. Valve 49 is then opened and clutch 52 engaged and air is fed via ducts 48 to the supply ports 43, 45 and 46. Air issues from the supply ports in the form of air curtains and encloses spaces beneath the wings and the fuselage of the vehicle. The supply ports 43 and 45 are directed inwardly towards the centres of the spaces enclosed, and the air curtains initially extend at an angle to the vertical beneath the fuselage and wings. Cushions of pressurised air are rapidly built up in the spaces beneath the wings and fuselage and as the pressure of the cushions rises the air curtains are deflected so that they impinge into the ground. The pressure will still further rise, acting on the under surface of the wings and fuselage and will lift the vehicle. The air curtains are further deflected by this pressure rise until they follow curved paths, with a mean radius of curvature equal to about half the height of the under-surface from the ground, with the centres of curvature disposed outside the curtains and substantially vertically beneath the supply ports 43 and 45. This can readily be seen in FIGURES 11 and 12. Further increasing the speed of the engines will result in the aircraft being propelled forward, whilst supported on the cushions of pressurised air.

Air issues from the supply port 46 in a vertical direction and divides the cushion formed beneath the fuselage into two, improving the stability of the vehicle in the manner explained in co-pending application Serial No. 16,677, filed March 22, 1960. Further stability can be provided by forming a further supply port in the undersurface of the wing. This is shown in FIGURE 13. The additional supply port 53 extends substantially the length of the wing and divides the cushion of pressurised air beneath the wing into two. The air is fed to the supply port 53 via ducts 54 which communicate with the ducts 48.

As the aircraft gathers speed the lower part of the air curtain formed from that part of the supply port 45 which is adjacent to the leading edge of the wing is deflected rearwardly. Eventually the lower parts of all the air curtains beneath the wing are deflected and eventually the air curtains unite to form a composite curtain enclosing a wedge shaped cushion of pressurised air, as described above with reference to FIGURES 1 to 3.

The cushion of air formed beneath the fuselage of the aircraft can normally be dispensed with once the vehicle is off the surface and supported by aerodynamic lift. To dispense with the cushion, the air issuing from the supply ports 43 and 46 needs to be shut off. This can be done by providing valves, such as sliding flaps 55. Alternatively, it can be arranged that air from the inboard engines 47 is fed to a separate duct in the fuselage for supplying the supply ports 43 and 46, while the outboard engines supply air to a duct 48 in each wing. In a further alternative arrangement, the engines 47 may supply the air for the air curtains formed beneath the wings, whilst separate engines, indicated at 56 in FIGURES 7 and 9 supply air for the air curtains formed beneath the fuselage. These engines 56 can be shut down when the aircraft is in flight. The exhaust gases from the engines 47 may also be fed into the ducts 48, but in such a case additional means for propelling the aircraft will be required.

The invention is of course readily applicable to aircraft having a different configuration to that shown in FIGURES 7, 8 and 9. For example it is applicable to delta-wing aircraft as shown in FIGURE 14, in which there is a continuous supply port 60 around the periphery of the wing. Further supply ports 61 may be provided to improve the stability of the aircraft when taking off and landing and for varying the centre of pressure of the wedge shaped cushion of air as described above. Other configurations to which the invention can be applied are aircraft of the so-called "flying-wing" type in which the aircraft is in the form of a wing, with little or no fuselage as such, and aircraft having other planforms such as circular, oval and the like.

It will be appreciated that there is a considerable saving in the power required as compared with vertical take-off aircraft. Although some form of roughly prepared surface is required for take-off and landing, when operating from land or similar surfaces, the degree of smoothness is not critical and concentrated loads are not imposed. The advantage is also obtained of a characteristic increase in lift with decrease in height for heights of the order of half the width of the cushion or less, thus resulting in a positive take-off and touch-down.

I claim:

1. A wing for an aircraft provided with a first supply port in the bottom surface of the wing adjacent and substantially parallel to the leading edge and a second supply port in the bottom surface of the wing adjacent and substantially parallel to the trailing edge, means for supplying a gas to the supply ports and causing said gas to issue from the supply ports in the form of gaseous curtains which at least partially bound a space beneath the wing, said supply ports being so constructed and arranged that the gaseous curtains are discharged therefrom at substantial angles to the bottom surface of said wing, and means for forming and maintaining at least one cushion of pressurised fluid in said space during operation of the aircraft, said cushion assisting in supporting the aircraft during take-off and landing and also acting to produce aerodynamic lift on the wing when the aircraft is in motion.

2. A wing for an aircraft as claimed in claim 1 in which the gaseous curtains form and maintain the cushion of pressurised fluid.

3. A wing for an aircraft as claimed in claim 1 in which at least one further supply port is provided in the bottom surface of the wing intermediate of and extending substantially parallel to the first and second supply ports, and in which means are provided for supplying a gas to the further supply port, the gas issuing from this supply in the form of a curtain subdividing the said space.

4. A wing for an aircraft, as claimed in claim 1, in which the gas supplied to the supply ports is air.

5. A wing for an aircraft, as claimed in claim 3, in which the gas supplied to the supply ports is a mixture of air and engine exhaust gases.

6. In an aircraft having a fuselage, wings and engines for imparting forward movement to the aircraft, the combination therewith of means for enabling the aircraft to take-off from or land on a surface substantially vertically comprising a source of moving gas, and means for so discharging said gas from the aircraft as to form at least one curtain of downwardly moving gas which effectively encloses a space between the underside of said aircraft and said surface containing a cushion of gas having a built-up pressure sufficient to assist in supporting the aircraft out of contact with said surface, said gas discharging means including an endless, substantially elliptically extending mouth in the underside of said fuselage which is so formed as to direct the curtain of gas discharged therefrom inwardly with respect to the area enclosed by the mouth.

7. An aircraft as claimed in claim 6, including a mouth in the underside of each wing of the aircraft which is so formed as to direct a curtain of moving gas inwardly with respect to the area of the wing enclosed by said mouth.

References Cited in the file of this patent

UNITED STATES PATENTS

| | | |
|---|---|---|
| 1,123,589 | Porter | Jan. 5, 1915 |
| 1,854,043 | Korner | Apr. 12, 1932 |
| 2,364,677 | Warner | Dec. 12, 1944 |
| 2,396,911 | Anxionnaz | Mar. 19, 1946 |
| 2,807,428 | Wibault | Sept. 24, 1957 |
| 2,945,641 | Pribram | July 19, 1960 |

FOREIGN PATENTS

| | | |
|---|---|---|
| 427,728 | Italy | Nov. 26, 1947 |

OTHER REFERENCES

National Advisory Committee for Aeronautics Technical Note 3982, "Exploratory Study of Ground Proximity Effects on Thrust of Annular and Circular Nozzles," by Uwe H. von Glahan, Apr. 16, 1957.